Figure 1:
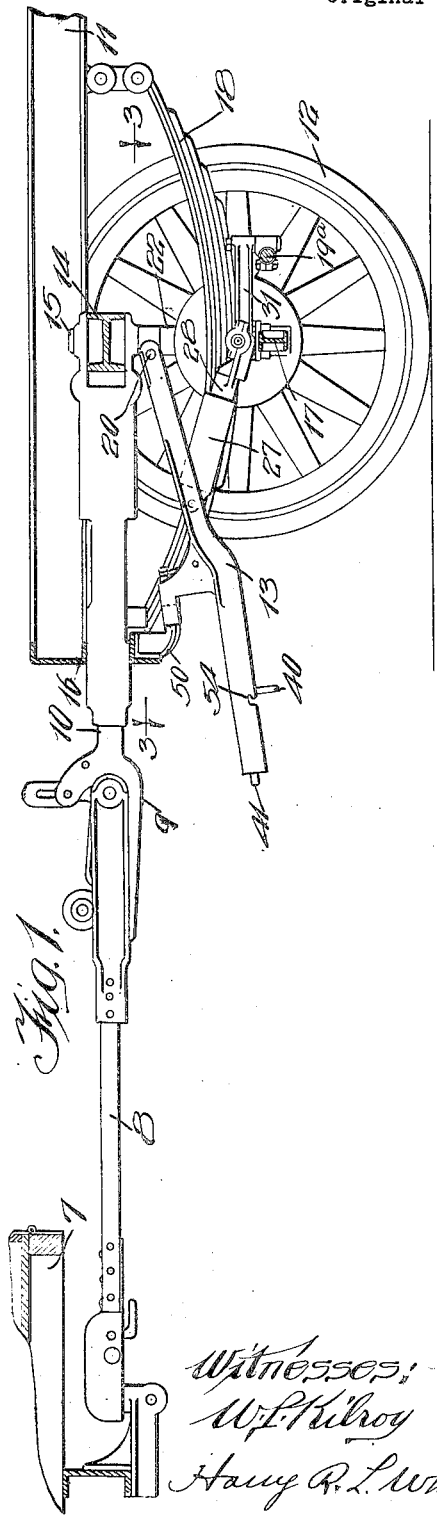

Oct. 21, 1924.

A. B. CADMAN

TRAILER TRUCK

Original Filed Oct. 11, 1919  2 Sheets-Sheet 1

1,512,521

Witnesses:
W. F. Kilroy
Harry R. L. White

Inventor:
Addi Benjamin Cadman
By Miller Chindahl & Parker
Attys.

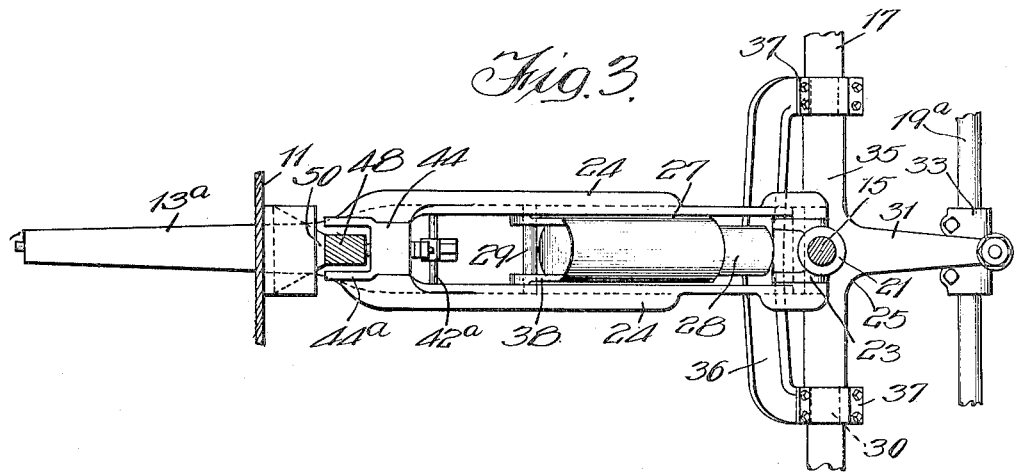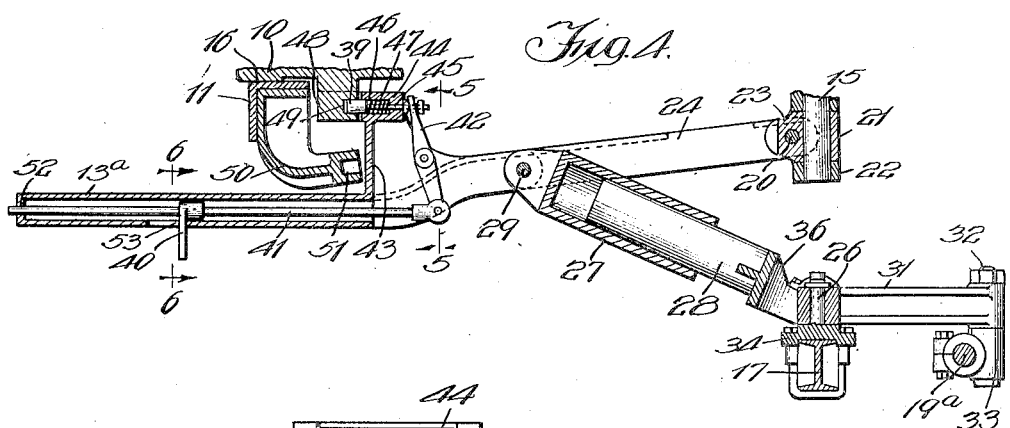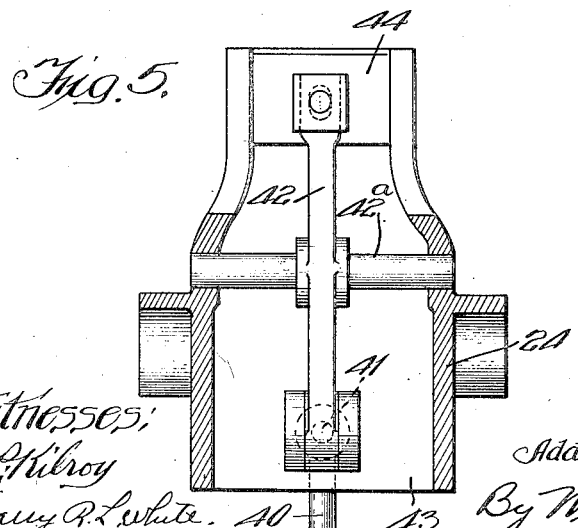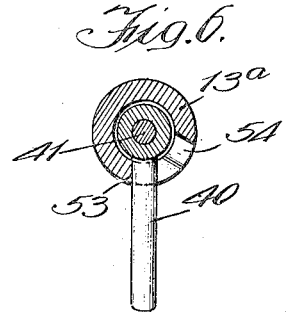

Patented Oct. 21, 1924.

1,512,521

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF WISCONSIN.

TRAILER TRUCK.

Application filed October 11, 1919, Serial No. 329,978. Renewed September 6, 1924.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

The invention relates to trailer trucks and has for its general object the provision of an improved steering mechanism which will facilitate the manipulation of such trucks.

The invention is particularly applicable to trailer trucks having two sets of wheels, each set being provided with a separate steering mechanism, including a draw-bar, so that the truck may be drawn from either end by simply locking the wheels at the opposite end from swinging. Heretofore such locking of the wheels has been accomplished by locking the draw-bar itself, but this construction has certain disadvantages incident to backing the truck. In this operation it has usually been necessary to lock against swinging movement the set of wheels and the draw-bar located at the end adjacent to the motor vehicle, and the difficulty arises from the fact that when the draw-bar is thus locked and force is applied to the forward end thereof by the motor vehicle, in any direction, except in a straight front to rear direction, side pressure is exerted upon the trailer truck with an undue amount of strain upon the draw-bar and its locking means.

The present invention aims to overcome this objection by the provision of means of an advantageous character for locking the wheels against swinging while permitting the draw-bar to swing freely, thus allowing pressure exerted by the motor vehicle to be applied to the trailer at the king-pin of the draw-bar irrespective of the relative positions of the two vehicles, and permitting, moreover, a freedom of movement of the motor vehicle equal to the extent of swinging movement of the draw-bar.

A further object is to provide a steering mechanism which will permit of the manual manipulation of the steering wheels independently of their draw-bar.

Trailer trucks of the general character stated usually comprise springs between the axles and frame, so that in the travel of the vehicle relative motion occurs between the axles and the frame. A further object of the present invention is to provide a steering mechanism having improved means permitting such relative movement between the frame and axles without affecting the position of the wheels.

The objects of the invention thus generally stated may be attained by the construction and arrangement illustrated in the accompanying drawings wherein I have illustrated a preferred embodiment of the invention. It will be understood, however, that the invention is not limited to the particular construction and arrangement herein set forth for accomplishing the results indicated, since many changes may be made without departing from the spirit and scope of my invention.

Figure 2:
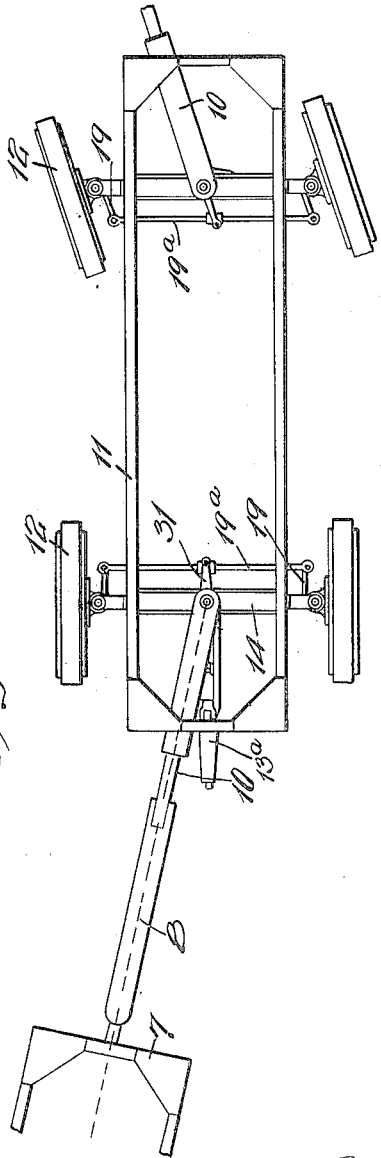

In the drawings, Figure 1 is a fragmentary longitudinal section through the rear portion of a motor vehicle comprising the drawing unit, and one end of a trailer, the steering mechanism being shown in position for backing. Fig. 2 is a semi-diagrammatic plan view illustrating the advantageous operation of the improved steering gear in backing, one set of wheels of the trailer being shown as locked against swinging and the other set swung in order to direct the trailer as desired. Fig. 3 is a longitudinal section taken on an enlarged scale in the plane of line 3—3 of Fig. 1. Fig. 4 is a fragmentary longitudinal central section taken in a vertical plane through the steering mechanism. Fig. 5 is an enlarged sectional view taken in the plane of line 5—5 of Fig. 4 and showing details of construction. Fig. 6 is a section taken in the plane of line 6—6 of Fig. 4, also showing details of construction.

Referring to the drawings, 7 designates a drawing unit connected by means of a link 8 and coupling 9 with the sectional draw-bar 10 of a trailer truck, comprising a frame 11 mounted upon wheels 12. 13 designates the steering bar or lever of mechanism provided in accordance with my invention for steering the vehicle either through the medium of the draw-bar or manually independently thereof.

The coupling parts for connecting the drawing unit 7 with the trailer truck may be of any desired construction, but I prefer the coupling means shown in my prior Patent No. 1,245,676 issued November 6, 1917, to which reference may be had for details.

The frame 11 of the truck has a cross bar 14 at each end to which the draw-bar 10 is pivoted by means of a king-pin 15. The frame is also constructed at each end to provide a guideway 16 for the draw-bar. 17 designates the axles of the truck between which and the frame springs 18 are interposed. The wheels 12 are provided with steering knuckles 19 and each pair of these knuckles is connected to a single tie rod 19ª which maintains the wheels in parallelism at all times. Inasmuch as the steering mechanisms at opposite ends of the trailer are substantially identical, the description of one only will suffice.

The steering bar 13 is mounted at its rear end to swing on the king-pin 15 and also on a horizontal pivot 20. To this end a collar 21 is mounted on the king-pin, bearing between the draw-bar and a fixed collar 22 on the lower end of the king-pin. The collar 21 has on one side a boss 23 adapted to receive the pin 20, and the steering bar is bifurcated so as to straddle said collar 21 with the opposite ends of the pin 20 passing between the arms 24 of the bifurcated steering bar.

To connect the steering bar with the wheels 12 so that movements imparted to the bar shall impart a corresponding swinging movement to the wheels, I provide a lever 25, mounted to swing on a vertical pin 26 rigid with the axle 17 and arranged co-axially of the king-pin 15; also an extensible connection between said lever and the steering arm comprising two relatively slidable elements 27 and 28, the former of which is in the form of a cylinder connected to the steering arm on a horizontal pivot 29, and the latter of which is in the form of a plunger mounted to swing on horizontal journals 30 on the lever 25.

The lever 25 is T-shaped in form and its longitudinal arm 31 is connected at its rear end to the tie rod 19ª by means of a vertical pivot pin 32 carried by a collar 33 rigidly clamped upon the tie-rod (Fig. 4). The pin 26 upon which the lever pivots may be carried by a bracket 34 clamped upon the axle in a suitable manner, as that shown in the last named figure. The cross arm 35 of the T-shaped lever 25 carries at its opposite ends the journals 30 upon which the plunger 28 is mounted. For thus mounting the plunger 28 it has at its lower end rigid therewith a pair of oppositely extending arms 36 each having a journal bearing 37 at its free end for receiving the journals 30 of the lever 25. The pivot 29 upon which the forward end of the cylinder 27 is mounted, extends between the arms 24 of the steering bar 13 (Fig. 3), and the cylinder is provided with a pair of arms 38 spaced apart so as to fit neatly between the arms 24 and apertured to receive the pin 29. The forward end of the cylinder 27 thus enters the space between the arms 24, as shown in Fig. 4, and it will be seen that vertical swinging movement of the steering arm is thereby permitted while horizontal swinging movement of the steering arm is imparted to the tie-rod 19ª through the medium of the T-lever 25. The extensible connection provided by the elements 27 and 28 provides a yielding but laterally inflexible connection between the axle 17 and the frame when the steering bar is made rigid therewith in a manner to be later set forth. By such connection any up and down movements between the axle and frame are effectively compensated for. Furthermore, it will be observed that the connection provided by the elements 27 and 28 permits of a relative twisting movement between the axle and the frame due to the passing of one of the wheels into a depression in the roadway or over an obstruction therein.

The steering bar is provided in its forward portion with means whereby it may be connected for movement with the draw-bar or against movement with the frame. Such means may comprise a latch element or detent 39 in the form of a plunger operable by means of a hand lever 40, through the medium of a rod 41 and a lever 42, into and out of operative or locking engagement with the draw-bar or the frame as may be desired.

To provide a mounting for the detent 39, the steering bar has near its forward end a transverse web portion 43 which connects the arms 24 of the bar and rises upwardly centrally of the bar to provide a bearing 44 having a longitudinal opening therethrough for receiving a stem 45 rigid with the plunger 39 and extending rearwardly from the bearing for connection with the upper end of the lever 42, the latter being mounted on a pin 42ª (Fig. 5) extending between the arms 24 of the bar 13. In the forward end of the bearing 44 is provided a socket 46 in which the plunger 39 is adapted to operate, and in said socket is provided a coiled compression spring 47 bearing against the plunger so as to normally force it forwardly. To provide keepers for the plunger, the draw-bar 10 is provided with a lug 48 having a socket 49 therein; and the frame 11 is provided with a member 50 having a socket 51 therein. Preferably the bearing 44 is provided with forwardly extending arms 44ª (Fig. 3) adapted to straddle the lug 48 and socket member 50.

The steering bar, in its forward end, is restricted in size, as at 13ª, and is made hollow to receive the rod 41, the forward end of the latter passing through the forward end of the bar at 52. The hand lever 40 is rigidly secured at one end to the rod 41 and depends through a longitudinal slot 53 in the bottom wall of the bar 13 so that a forward pull of the depending portion of the lever 40 will move the rod 41 and, through the link 42, the plunger 39 rearwardly. The plunger may thus be released from either of its sockets 49 or 51, the latter socket being located a short distance below the former and in the arc of the circle described by the bar on its horizontal pivot pin 20.

When it is desired to lock the plunger in its inoperative or rearmost position, as when the bar is to be swung manually, this may be accomplished by rotating the lever 40 through a slight arc into a transverse slot or notch 54 (Fig. 1), which is formed in one side wall of the bar 13 at the forward end of the slot 53.

It will be apparent that through the medium of the locking means thus set forth, the steering bar may be made rigid either with the draw-bar of the trailer or with the trailer frame. When the steering bar is made rigid with the draw-bar, as when the vehicle is moving forwardly in the ordinary course of travel, the movements imparted to the draw-bar are also imparted to the steering wheels, through the medium of the steering bar, the lever 25 and the extensible connection between the lever and the steering bar. When, however, the steering bar is made rigid with the frame, the wheels are locked against swinging and the draw-bar is capable of swinging independently of the steering bar. This construction is advantageous when the trailer is to be backed, since it enables the wheels to be locked and at the same time the pressure applied to the draw-bar by the motor vehicle, whether the latter is positioned directly forwardly of the trailer or to one side as in Fig. 2, is exerted upon the king-pin (see Fig. 2) instead of upon the locking means employed at the forward end of the frame, as is the case with prior art constructions wherein the locking of the draw-bar is depended upon to lock the wheels.

The free swinging movement of the drawbar in the backing operation is also advantageous in that it allows a freedom of movement of the actuating unit from side to side in backing. The extent of such movement is defined by the arc described by the drawbar in swinging to its opposite extremes as limited by the guideway 16 in the frame.

Moreover, it will be apparent that while the trailer is being backed, either or both sets of wheels may be manipulated in positioning the trailer as desired. In Fig. 2 the rear wheels of the trailer are shown as swung manually to one side and the forward wheels are shown as locked, but it will be seen that the forward wheels may also be swung manually to further facilitate the positioning of the truck.

It will also be observed that the steering bar is advantageously arranged with reference to the draw-bar and frame of the truck, so that it may be conveniently grasped by the operator; and the operating handle of the locking means is also readily accessible. Furthermore, the construction and arrangement is such that the wheels may be swung with the expenditure of very little effort.

I claim as my invention:—

1. A trailer truck comprising the combination of a running gear including individually swivelled steering wheels, a draw bar pivotally mounted on the running gear to swing horizontally, a steering lever having a universal mounting on the running gear so as to be capable of swinging movement with the draw bar or up and down with relation thereto, a steering connection between said lever and said wheels, two locking elements mounted respectively on said draw bar and on the fixed part of the running gear in different positions of elevation, and a single manually operated locking device carried by said steering lever and arranged to cooperate selectively with said two locking elements when the steering lever is in different positions of elevation for locking said steering lever either to the draw bar or to the fixed part of the running gear, or permitting the operator to manually swing said lever and the wheels independently of the draw bar.

2. A trailer truck having, in combination, an axle provided with dirigible wheels, a body frame supported from said axle, a draw bar pivoted to said body frame to swing in a horizontal plane, a steering bar mounted upon the body frame to swing horizontally with said draw bar, and also to swing up and down, means for optionally locking the steering bar in its different positions of elevation either to the body frame or the draw bar, and means providing a steering connection between said steering bar and the wheels.

3. A trailer truck comprising, in combination, a frame, a set of steering wheels, a member mounted to swing on a vertical axis and operatively connected with said wheels, a draw-bar and a steering bar pivoted to the frame on a common axis approximately coinciding with the axis of said member, said steering bar being also adapted to swing on a horizontal pivot, locking means including a latch element carried by the steering bar and a pair of keeper elements on the drawbar and frame respectively, said latch element being adapted to be moved by a swinging movement of the steering bar in a vertical plane from operative engagement with one of said keeper elements into operative engagement with the other keeper element and vice versa, and means connecting said member with said steering bar and permitting of the swinging movements of the latter.

4. A trailer truck comprising, in combination, a main axle having stub axles with steering wheels thereon, a body frame, springs supporting said frame from said main axle, a draw bar pivoted on said body frame to swing horizontally, a steering member mounted on said body frame to move horizontally with said draw bar and also to move up and down with relation to said draw bar, means for optionally locking said steering member either to the body frame or the draw bar, and connecting means forming an operative connection between said steering member and said stub axles for steering the wheels, said connecting means including an extensible and contractible device to compensate for the different positions of said steering member and also for the relative movement between said body frame and said main axle due to deflection of said springs.

5. A trailer truck comprising, in combination, a running gear, a draw bar pivoted on the running gear, a steering lever pivoted on the running gear and operatively connected with the wheels, and locking means for selectively securing said lever to said draw bar and to said gear comprising a spring detent carried by said lever and adapted to engage keeper sockets carried by said running gear and said draw bar respectively, an operating rod movable longitudinally of said steering lever to operate said detent, and a handle carried by said rod and movable therewith longitudinally of said steering lever, said handle being operable in a bayonet slot in said steering lever to lock said rod.

6. A trailer truck comprising, in combination, a frame, an axle, wheels pivotally mounted at the opposite ends of said axle, a draw-bar pivoted to the frame, a steering bar bifurcated to provide a pair of arms also pivoted to the frame, means including a member pivotally mounted on said axle, and a member pivoted between said arms and operatively associated with the first member for connecting the steering bar to said wheels, and means for locking the steering bar either to the draw-bar or to the frame.

7. In a trailer truck having steering wheels, a steering bar operatively connected with the steering wheels, and means for locking the steering bar in a predetermined position comprising a keeper element, a spring-controlled latch member, a lever connected at one end to said latch member and pivoted between its ends to the steering bar, and an operating rod slidably mounted in the free end of the steering bar and connected to the other end of said lever.

8. A trailer truck comprising, in combination, a draw-bar, a steering bar, and locking means between the draw-bar and steering bar comprising a keeper on one of said bars, a spring-controlled latch member on the other one of said bars, a lever connected with said latch member, an actuating rod connected with the lever and slidable longitudinally of the last mentioned bar, said rod having a handle and said bar having a bayonet slot for retaining the handle and thereby holding the latch element in inoperative position.

In testimony whereof, I have hereunto set my hand.

ADDI BENJAMIN CADMAN.